G. DALÉN.
MEANS FOR OPENING AND CLOSING VALVES IN CERTAIN DETERMINED INTERVALS OF TIME.
APPLICATION FILED APR. 3, 1915.
1,304,159.
Patented May 20, 1919.
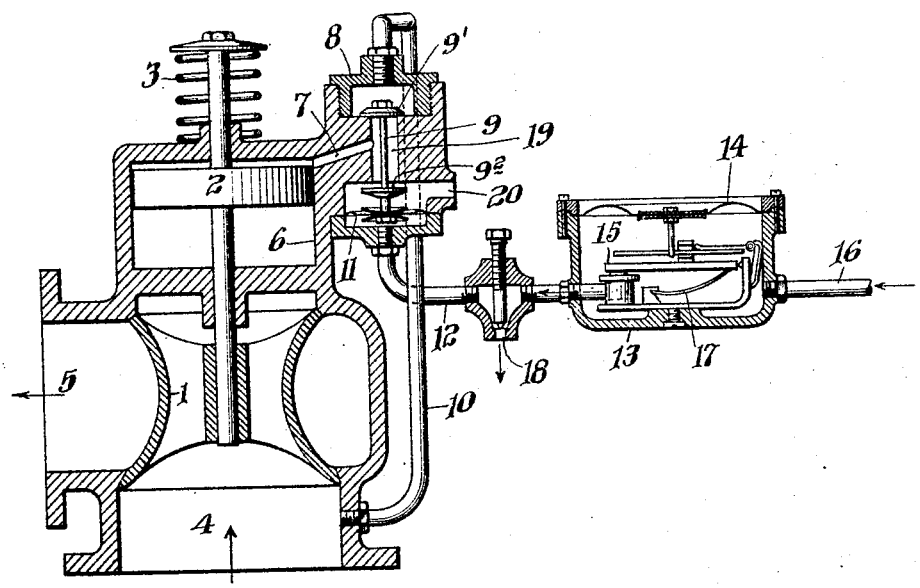
WITNESSES
INVENTOR
Gustaf Dalén
BY
ATTORNEY

UNITED STATES PATENT OFFICE.

GUSTAF DALÉN, OF SKÄRSÄTRA, LIDINGÖN, STOCKHOLM, SWEDEN, ASSIGNOR TO AMERICAN GASACCUMULATOR COMPANY, OF ELIZABETH, NEW JERSEY, A CORPORATION OF NEW JERSEY.

MEANS FOR OPENING AND CLOSING VALVES IN CERTAIN DETERMINED INTERVALS OF TIME.

1,304,159.  Specification of Letters Patent.  Patented May 20, 1919.

Application filed April 3, 1915. Serial No. 19,015.

*To all whom it may concern:*

Be it known that I, GUSTAF DALÉN, engineer, residing at Skärsätra, Lidingön, Stockholm, Sweden, have invented certain new and useful Improvements in Means for Opening and Closing Valves in Certain Determined Intervals of Time, of which the following is a specification.

The present invention has for its object to open and close a valve, especially an inlet valve for a fluid under pressure, in certain determined intervals of time.

The invention is characterized by the combination with said inlet valve of an automatic valve device, such as is used in the commonly known automatic flash light apparatus, and which periodically opens and closes a conduit for a fluid under pressure, actuating the said inlet valve in the manner described below.

As known such apparatus consist of a diaphragm casing, into which gas flows and actuates a diaphragm, connected with a valve, which opens when the pressure in the diaphragm casing is raised to an amount determined by a spring, actuating the valve, and permits the gas to escape through a conduit, whereby the pressure in the diaphragm casing is diminished and the valve is again closed. Now, according to the invention such an apparatus is combined with the inlet valve in question either in such a manner that the movement of the said diaphragm is transmitted directly or indirectly to the inlet valve, which thus is caused to follow the movements of the diaphragm, and thus is opened and closed in accordance with the valve of the flash apparatus, or the fluid under pressure flowing through the flash apparatus is caused to actuate a special regulating device, such as a valve or a slide, which introduces and cuts off a fluid under pressure, actuating a piston, connected with the inlet valve, in accordance with the valve of the flash apparatus.

On the accompanying drawing a construction according to the invention is illustrated schematically in a vertical section.

1 indicates the inlet valve, which is to be opened and closed periodically, 2 is the piston, connected with said valve, and actuated by a spring 3, tending to close the valve 1. 4 indicates the inlet and 5 the outlet of the fluid under pressure, flowing through the valve. The piston 2 is movable in a cylinder 6, which on the one side of the piston 2 is connected by a channel 7 with the interior of a valve casing 8, in which a valve 9, which in the construction shown is formed as a double seat valve, is movable. In the valve casing 8 opens a conduit 10, connected with the inlet 4. The valve 9 is connected with a diaphragm 11, actuated by the pressure in the conduit 12, constituting the outlet conduit of the flash apparatus 13. Said apparatus consists of a diaphragm 14, connected with a valve 15, which operates to open and close the outlet opening to the conduit 12. Gas is admitted to the chamber of the apparatus 13 through a conduit 16. A spring 17 having connection with valve 15 tends to hold the latter in closed position, and said valve is held in closed position except when the force exerted thereupon by the diaphragm 14 due to the expansive pressure of the gas in the chamber of said apparatus is sufficient to overcome the force exerted by the said spring.

The working of the arrangement is as follows. When the valve 15 of the flash apparatus is open, fluid under pressure flows through the outlet conduit 12 to the chamber on one side of the diaphragm 11, so that said diaphragm is actuated and the part 9' of the valve 9 opens the connection between the conduit 10 and the cylinder chamber on one side of the piston 2. Said piston is thus moved forward against the action of the spring 3 and opens the valve 1, so that fluid under pressure flows through the valve from the inlet 4 to the outlet 5. When the pressure in the diaphragm casing 13 owing to a larger outflow than inflow of fluid under pressure is diminished in such a degree, that the pressure of the spring 17 overcomes the pressure on the diaphragm 14, the valve 15 is closed. The fluid under pressure, remaining in the conduit 12, gradually flows out into the atmosphere through an adjustable opening 18, whereby the pressure on the diaphragm 11 is diminished and said diaphragm returns to its original position, in which the part 9' of the valve closes the connection between the conduit 10 and the cylinder chamber on the one side of the piston 2, whereas the part 9² of the valve opens the connection between said cylinder chamber and the atmosphere through the channels 19 and 20, whereby the piston 2 returns to its original position and closes the valve 1 under the action of the spring 3.

Said valve is thus opened and closed in accordance with the movements of the valve 15 and in the same intervals as said valve 15. In a known manner an additional amount of fluid under pressure may be introduced to the diaphragm casing 13 and the valve 15 may thus be caused to open and close in unequal intervals of time, whereby also the inlet valve 1 is caused to open and close in unequal intervals of time in a corresponding manner.

In certain cases the regulating device 9 may be omitted and the movement of the diaphragm 14 may be transmitted directly or indirectly by mechanical means, such as levers, bars and the like, to the valve 1 or to its piston 2. Such an arrangement may be understood without any special drawing.

The invention is generally employable in the cases, when a valve is to be opened and closed periodically. Especially in phonic signal apparatus, in which the phonic apparatus, a siren or a whistle, periodically is caused to sound by means of compressed air, the invention has proved advantageous, the outlet 5 in such case being connected with the siren or whistle.

Having now fully described my invention, what I claim as new is:

1. Apparatus for periodically opening and closing a valve, comprising a movable wall connected with the valve and actuated by a fluid, controllable means for admitting said fluid to said wall at predetermined intervals independently of the position of said valve, and mechanism for controlling the operation of said means.

2. In combination, a valve actuated continuously at intervals by the pressure of a fluid so as to alternately open and close a conduit and thereby permit the flow of a fluid therethrough at intervals, said last named fluid being a fluid other than the first named fluid, and means actuated by said flow of fluid for controlling the flow of fluid through a conduit other than the first named conduit.

3. In combination, a valve actuated continuously at intervals by the pressure of a fluid so as to alternately open and close a conduit and thereby permit the flow of a fluid therethrough at intervals, said last named fluid being a fluid other than the first named fluid, a second conduit and means actuated by the flow of fluid through the first named conduit for opening and closing the second named conduit.

4. In combination, a conduit through which a fluid is adapted to flow, means for controlling the flow of fluid through said conduit, said means being independent of said fluid and being actuated continuously at intervals, a second conduit and means actuated by the flow of fluid through said first named conduit for controlling the flow of fluid through the second named conduit.

5. In combination, a conduit through which a fluid is adapted to flow, means actuated continuously at intervals for controlling the flow of fluid through said conduit, means actuated independently of the flow of fluid through said conduit for actuating the said controlling means, a second conduit and means actuated by the flow of fluid through the first named conduit for controlling the flow of fluid through the second named conduit.

6. In combination, a conduit through which a fluid is adapted to flow, means for opening and closing said conduit, means whereby a fluid under pressure actuates said first named means to cause opening and closing thereof to control the flow of fluid through said conduit, a second conduit through which a fluid is adapted to flow and means for controlling the flow of fluid through the second named conduit, said last mentioned means being in operative relation to said first named conduit and being actuated by the flow of fluid therethrough to continuously and alternately open and close said second named conduit.

7. In combination, an automatic valve actuated by the pressure of a fluid so as to open and close a conduit and thereby permit the flow of a fluid therethrough at predetermined intervals, said last mentioned fluid being a fluid other than the first named fluid, a movable member actuated by the said flow of fluid and a valve for controlling the flow of a fluid through a conduit other than the first named conduit which valve is actuated and controlled by the actuation of said movable member.

8. In combination, a conduit through which a fluid is adapted to flow, a valve structure for opening and closing the said conduit and thereby controlling the flow of fluid therethrough, a separate conduit for conducting a fluid under pressure to the said valve structure to actuate the same, a valve structure for controlling the flow of fluid through the second named conduit and means independent of the first named valve structure for automatically actuating the said second named valve structure.

9. In combination, a conduit through which a fluid is adapted to flow, a valve structure for opening and closing the said conduit to thereby control the passage of fluid therethrough, a separate conduit for conducting a fluid under pressure to the said valve structure to actuate the same in one direction, means for actuating the said valve structure in the opposite direction and means for automatically controlling the passage of fluid through the said second named conduit at intervals to thereby control the actuation of the said valve structure.

10. In combination, a conduit through which a fluid is adapted to flow, a valve structure for opening and closing the said conduit and thereby controlling the passage of fluid therethrough, a branch conduit communicating with the said conduit and adapted to convey fluid therefrom to the said valve structure to actuate the same and means actuated independently of the pressure of the fluid from said branch conduit for automatically controlling the passage of fluid through the said branch conduit.

11. In combination, a conduit through which a fluid is adapted to flow, a valve structure for opening and closing the said conduit, a conduit for supplying a fluid to actuate the said valve structure, a conduit closed at one end by a movable member, means for supplying a fluid at intervals to said last mentioned conduit to cause movement of said movable member and means connected with the last mentioned member for controlling the passage of fluid through the second named conduit and thereby actuating the said valve structure at intervals.

12. In combination, a conduit through which a fluid is adapted to flow, a valve for opening and closing the said conduit, a movable member having connection with the said valve said member being situated in a chamber, a conduit branching from the said first named conduit for supplying fluid to the said chamber to actuate the said member in one direction, said conduit communicating with a passageway leading to the atmosphere, a double seat valve, and means for moving said valve alternately in opposite directions, one part of said valve when in one position closing said conduit and the other part opening the passageway connecting with the atmosphere and permitting fluid to escape from the said chamber and when in opposite position the said parts respectively opening said conduit to permit fluid to enter said chamber and closing said passageway leading to the atmosphere.

13. In combination, a conduit through which a fluid is adapted to flow, a valve for opening and closing the said conduit, a movable member having connection with the said valve, said member being situated within a chamber, a conduit communicating with the said chamber, means for permitting a fluid to flow at intervals through the said conduit into the said chamber for causing movement of said member and the said valve in one direction, means for causing movement of the said member and valve in the opposite direction and a valve-controlled passageway for permitting escape of fluid from the said chamber as the said member moves in said opposite direction.

14. In apparatus for periodically opening and closing a valve, the combination of a member, means for supplying fluid under pressure to one side of said member to occasion movement thereof to open said valve, a valve for periodically interrupting the flow of fluid through said means to said member, means having connection with the said last mentioned valve for actuating the same, and means for automatically supplying fluid under pressure to one side of said valve actuating means for causing movement thereof to actuate the said second-named valve.

15. In apparatus for periodically opening and closing a valve, the combination of a cylinder, a piston operating in said cylinder and having connection with said valve, a conduit for supplying a fluid under pressure to said cylinder upon one side of said piston to actuate the latter, means for closing said conduit, and means whereby a fluid under pressure is adapted to move the said second means to open the said conduit.

16. In apparatus for periodically opening and closing a valve, the combination of a cylinder, a piston operating therein and having connection with said valve, a conduit for supplying fluid under pressure to said cylinder to operate said piston in one direction, a valve for closing said conduit, a diaphragm having connection with said valve and means for supplying fluid under pressure to one side of said diaphragm for opening said valve to permit the passage of fluid under pressure through said conduit to said cylinder for the purpose described.

17. In apparatus for periodically opening and closing a valve, the combination of a cylinder, a piston in said cylinder having connection with said valve, a conduit for supplying a fluid under pressure to said cylinder to cause movement of said piston and said valve in one direction, a valve for closing said conduit, means adapted to be acted on by a fluid under pressure for causing movement of said last mentioned valve in one direction to permit the flow of fluid through said conduit to said cylinder, and means whereby fluid under pressure is caused to act upon the said last mentioned means at intervals.

18. In apparatus for periodically opening and closing a valve, the combination of a cylinder, a piston operating in said cylinder and having connection with said valve, a conduit for supplying a fluid under pressure to said cylinder to operate upon said piston and cause movement thereof in one direction, a double-seated valve for closing said conduit, a chamber provided adjacent to said conduit, a flexible diaphragm extending across said chamber and having connection with said double-seated valve, and means for periodically supplying a fluid under pressure to one side of said diaphragm in said chamber to cause movement of said double-seated valve in one direction to open the said conduit said valve moving in the opposite direction upon the release of pressure from said chamber to close said conduit and simultaneously open a passage-way from the said cylinder to the air.

In testimony whereof I have affixed my signature in presence of two witnesses.

GUSTAF DALÉN.

Witnesses:
ELIN WAHMAN,
FRANK O. LYON.

Copies of this patent may be obtained for five cents each, by addressing the "Commissioner of Patents, Washington, D. C."